(12) United States Patent
Arnold

(10) Patent No.: US 7,325,035 B1
(45) Date of Patent: Jan. 29, 2008

(54) SYSTEM USING EMAIL MESSAGE TO TRANSMIT A COMMAND TO REMOTELY CONTROL A COMPUTER RESOURCE

(75) Inventor: Greg Arnold, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 495 days.

(21) Appl. No.: 09/769,834

(22) Filed: Jan. 24, 2001

(51) Int. Cl.
  *G06F 15/16* (2006.01)
(52) U.S. Cl. ............................. 709/206; 709/219
(58) Field of Classification Search ............... 709/206, 709/219; 379/88.14; 713/152
  See application file for complete search history.

(56) References Cited

U.S. PATENT DOCUMENTS

| | | | |
|---|---|---|---|
| 5,864,684 A * | 1/1999 | Nielsen | 709/206 |
| 6,003,070 A * | 12/1999 | Frantz | 709/206 |
| 6,449,343 B1 * | 9/2002 | Henderson | 379/88.14 |
| 6,697,942 B1 * | 2/2004 | L'Heureux et al. | 713/152 |
| 6,742,024 B1 * | 5/2004 | Ono | 709/219 |

OTHER PUBLICATIONS

David Pogue, PalmPilot: The Ultimate Guide, Second Eddition, Jun. 1, 1999.*

* cited by examiner

*Primary Examiner*—Le Hien Luu
(74) *Attorney, Agent, or Firm*—Berry & Associates P.C.

(57) ABSTRACT

A Trojan horse method and apparatus to permit email access to secure enterprise resources within an enterprise's firewall. An email message is used to permit a user to gain access to computer resources such as databases maintained within a secure enterprise's firewall. An email message generated from a palmtop computer or any other computer capable of sending and receiving email messages is used to pass through the firewall as a conventional email message would. The email message is received at a designated computer that recognizes reserved command words as a part of the email message, preferably as a part of the subject line thereof. Upon recognizing the reserved command word, the email message is parsed to determine key components of a command that can be executed on a desired enterprise computer resource. An appropriate command (e.g., an SQL query) is then created for execution on the enterprise computer resource (e.g., a database). A response or acknowledgement is then returned to the sender as an email message.

21 Claims, 10 Drawing Sheets

# SYSTEM USING EMAIL MESSAGE TO TRANSMIT A COMMAND TO REMOTELY CONTROL A COMPUTER RESOURCE

FIELD OF THE INVENTION

The present invention relates to the field of computer communication methods and apparatus using email, and in particular, for such methods and apparatus using a palmtop computer.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

While these palm sized computers ("palmtop" computers) have dramatically reduced size when compared to a desktop or notebook computer, the user might often like to be able to perform many of the same types of functions performed using physically larger and more powerful computers. One way to accomplish this, as described in accordance with the present invention, is to use the palmtop computer to control the functions of a more powerful computer.

The term "Trojan horse" generally refers to a computer program that hides its true function within another computer program or data. Computer viruses often rely on such programming techniques to infiltrate a computer system and cause mischief. Many such computer programs have been developed to function as computer viruses, and many of them utilize email functions to hide the true purpose of the program.

SUMMARY OF THE INVENTION

Accordingly, what is needed is a computer system that can be easily controlled by a remote, and possibly less powerful computer (e.g., a palmtop computer) to secure information at the remote computer. The present invention provides one technique for addressing this need.

In one embodiment of the present invention, a Trojan horse method and apparatus is used to permit email access to secure enterprise resources within an enterprise's firewall. An email message is used to permit a user to gain access to computer resources such as databases maintained within a secure enterprise's firewall. An email message generated from a palmtop computer or any other computer capable of sending and receiving email messages is used to pass through the firewall as a conventional email message would. The email message is received at a designated computer that recognizes reserved command words as a part of the email message, preferably as a part of the subject line thereof. Upon recognizing the reserved command word, the email message is parsed to determine key components of a command that can be executed on a desired enterprise computer resource. An appropriate command (e.g., an SQL query) is then created for execution on the enterprise computer resource (e.g., a database). A response or acknowledgement is then returned to the sender as an email message. This provides the advantage that the sender is able to carry out transactions with secure resources within an enterprise firewall from a palmtop computer or other computer using simple email applications.

In another embodiment of the invention, a method of using an email message to control a computer resource, includes receiving an email message from a sender; recognizing a reserved command word within the email message; interpreting the email message as a command to be carried out on an available computer resource; and generating a command for execution on the available computer resource. Preferably, the process further includes receiving a result from the available computer resource and sending a reply email message communicating the result to the sender.

Another method of using an email message to control a computer resource, consistent with the invention, includes receiving an email message from a sender, the email message originating at a palmtop computer; recognizing a reserved word within a subject portion of the email message; interpreting the email message as a command to be carried out on an available computer resource comprising a computer database by parsing the email message into parts defining the computer resource and the command; generating a command as a database query for execution on the computer database; receiving a result from the available computer database; and sending a reply email message communicating the result to the sender.

A system consistent with embodiments of the invention that uses an email message to control a computer resource from a remote location includes a first programmed processor having an email program that receives an email message from a sender. A program operating on the first programmed processor recognizes a reserved command word within the email message interprets the email message as a command to be carried out on an available computer resource and generates a command for execution on the available computer resource.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

FIG. 8, which is made up of FIGS. 8A, 8B, 8C and 8D, is a flow chart illustrating the process for parsing an email message in an exemplary embodiment consistent with the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Email Access to Secure Enterprise Resources in Accordance with the Present Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
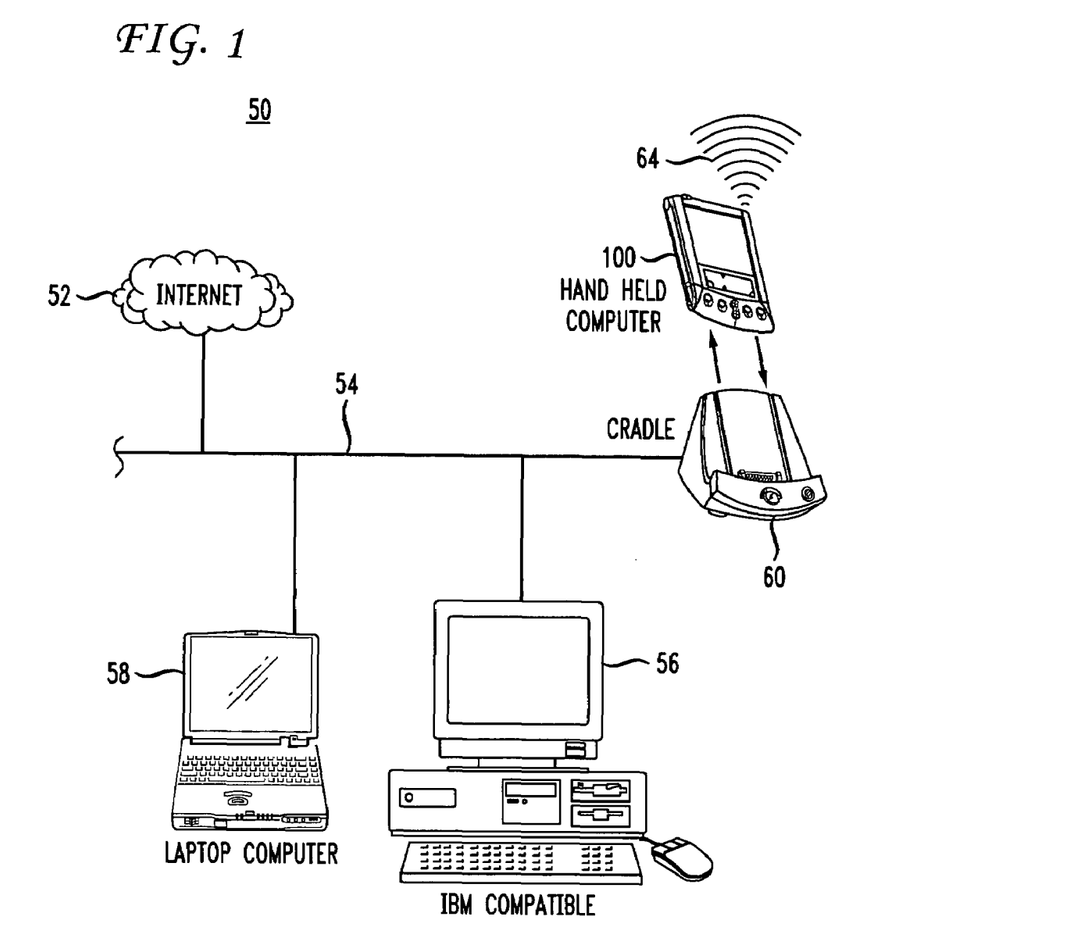
FIG. 1 is system illustration of a palmtop computer system connected to other computer systems and the Internet via a cradle device.

FIG. 1 illustrates a system 50 that includes a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
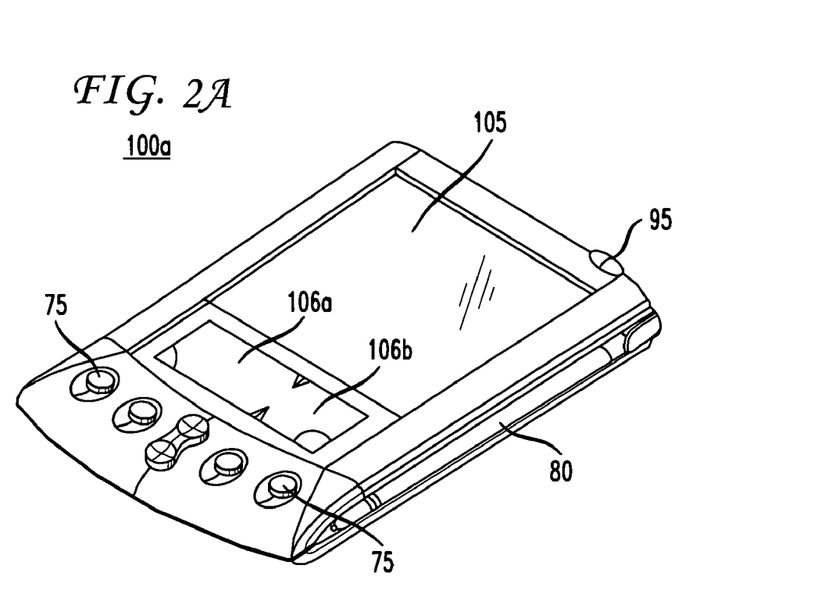
FIG. 2A is a top side perspective view of a palmtop computer system that can be used as a platform for data entry.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
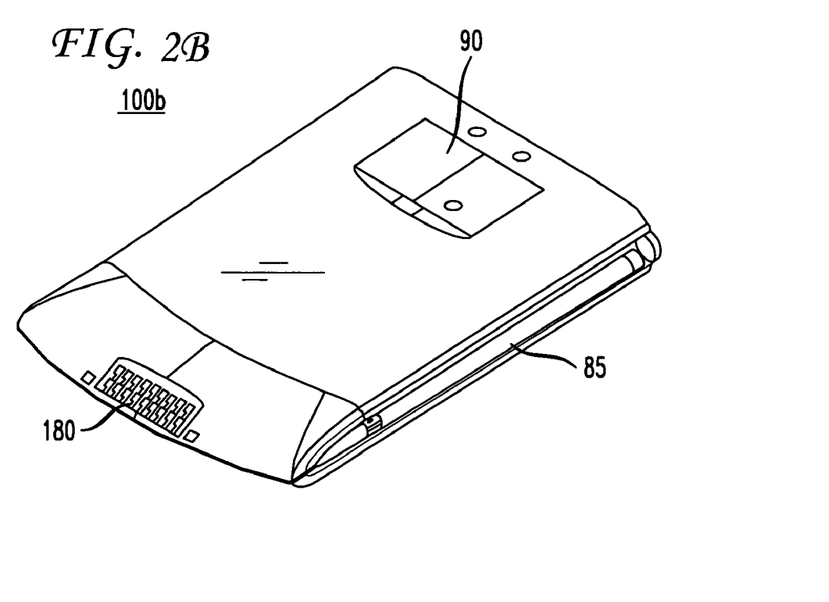
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, USB (Universal Serial Bus), etc. In addition to providing the serial interface, some versions of palmtop computers consistent with the present invention include charging terminals for charging internal batteries through the cradle connection at interface 108. Accordingly, interface 108 typically comprises approximately ten to twelve electrical connector terminals.

Figure 3:
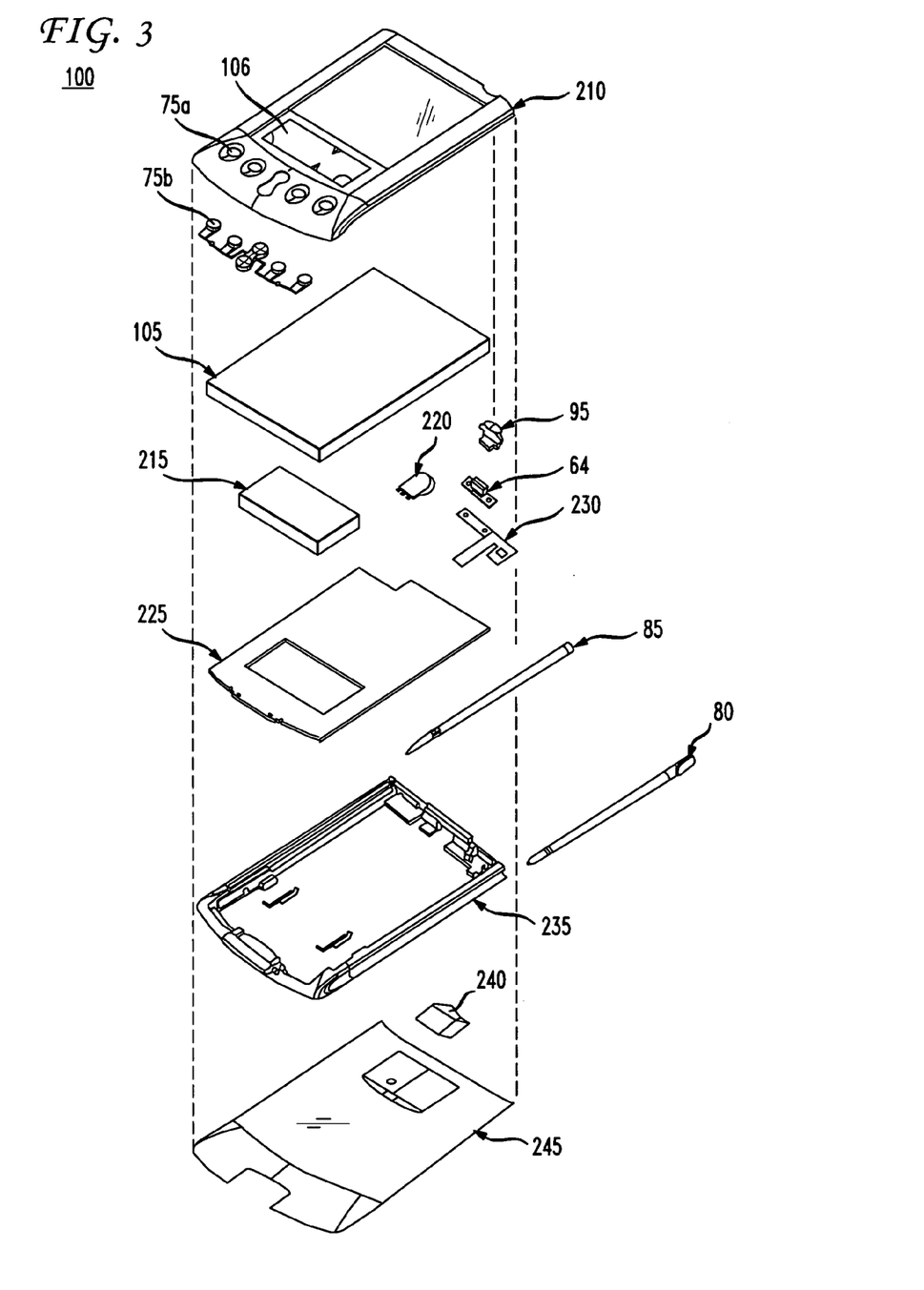
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
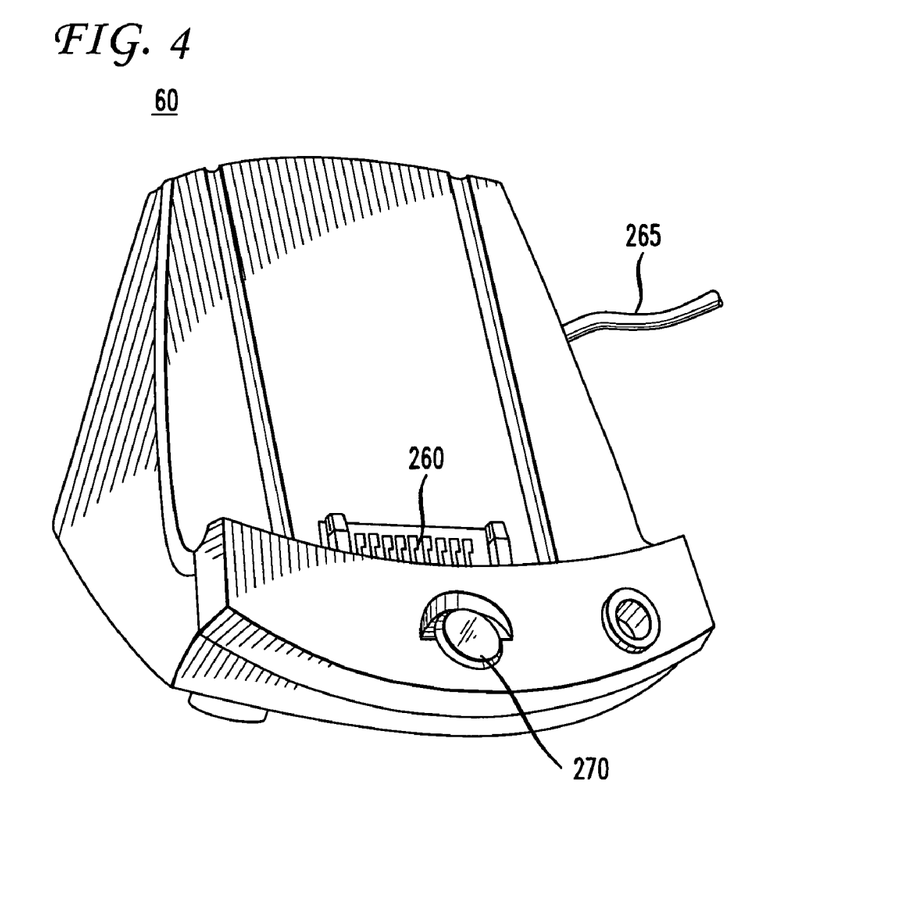
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
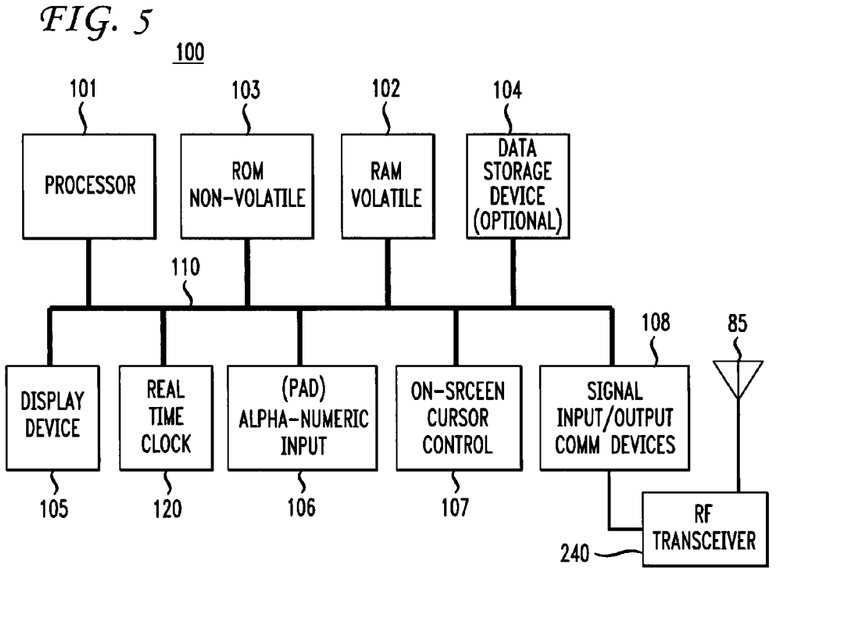
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick, SD memory, etc.) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the % computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port. Bus 110 can also be connected to an internal real time clock 120.

Figure 6:
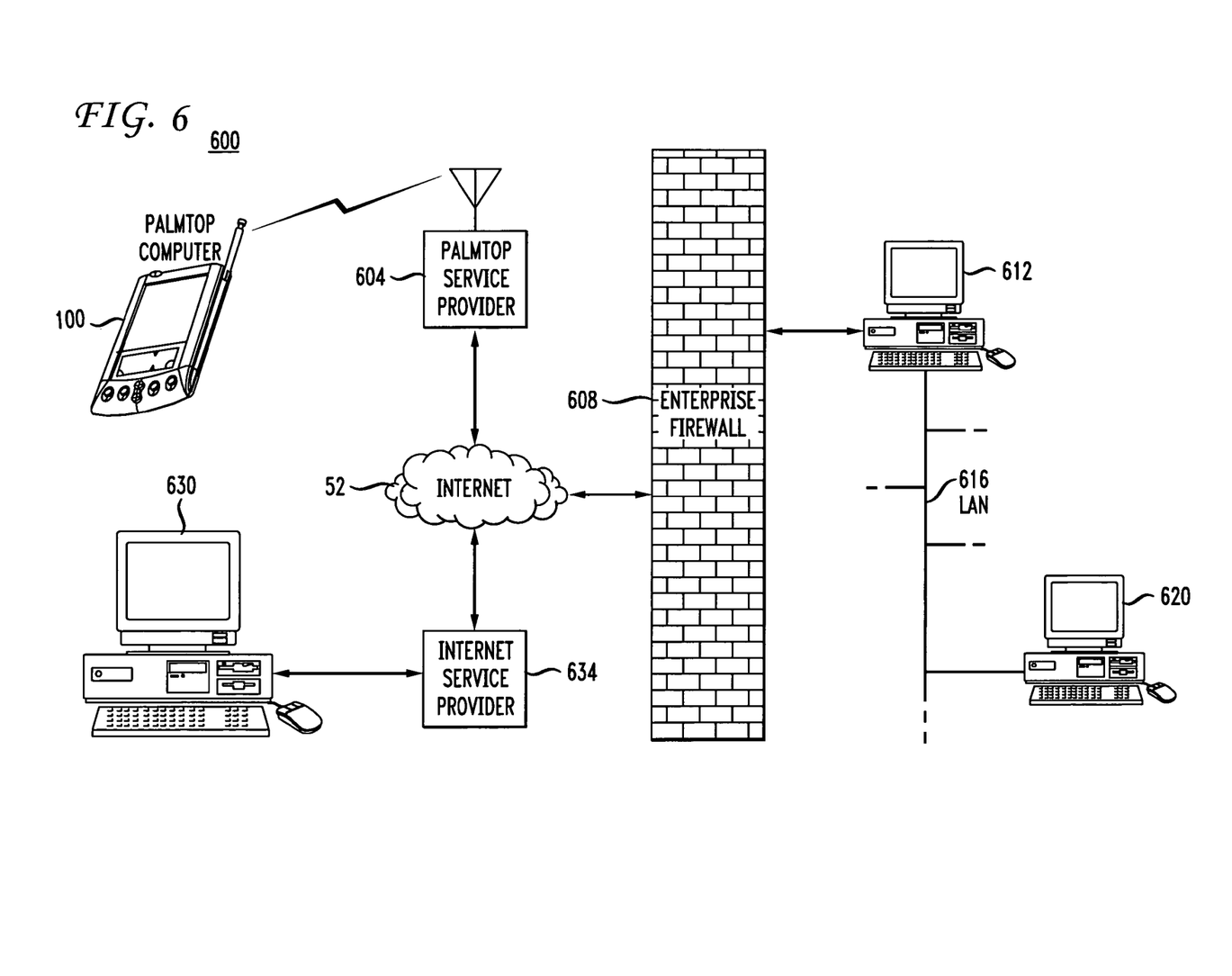
FIG. 6 is a block diagram illustrating an embodiment of a system using the present invention.

Referring now to FIG. 6, an exemplary system using the present invention is illustrated as 600. In this embodiment, a palmtop computer 100 communicates with the Internet 52 through a palmtop service provider 604. Service provider 604 provides for wireless communication with the palmtop and translation of such communication between a wireless protocol and Internet Protocol in a known manner. Such services are currently available from several vendors. In other embodiments, access to the Internet can be provided to the palmtop computer in other ways including infrared communication from the palmtop computer 100 to an Ethernet interface device or other techniques.

An enterprise provides access to Internet 52 through a firewall 608 to provide security to the enterprise's computing systems. In the present invention, a computer such as computer 612 is coupled to Internet 52 via the enterprise firewall 608 to send and receive email messages. Computer 612 includes software programs for carrying out the processes of the present invention to be described herein. Computer 612 may be coupled to a corporate network such as an Intranet comprising various Local Area Networks such as LAN 616 as well as possibly Wide Area Networks (WANs—not shown). Various other computers such as computer 620 including servers and workstations can be coupled to the various computer networks of the enterprise and may be used to carry out various enterprise or local computing applications. In an exemplary embodiment, computer 620 might store a corporation's database of employees with associated contact information including address and telephone number. Similarly, computer 612 could include the primary user of computer 612's personal contact database including names, company affiliations, addresses and phone numbers. Of course, this is a simple example and many other enterprise or local applications can be dealt with using the technique of the present invention.

The present system 600 also illustrates a computer 630 residing outside firewall 608 which can contact the Internet 52 either directly or through an Internet Service Provider (ISP) 634. A user can use the present invention to carry out transactions outside the enterprise firewall 608 from any such device including network appliances that are capable of sending and receiving email messages.

In accordance with embodiments of the invention, a Trojan horse technique is used to gain access to computer 612 from outside firewall 608 and carry out transactions with various enterprise computing resources. In preferred embodiments, the subject line of an email message is used to identify the enterprise resource being accessed, and the body is used to carry more specific information defining the transaction to be carried out. By way of example, and not limitation, the subject line can read "CONTACT" to identify a contact database residing on computer 612 or computer 620 (or any other computer resource accessible by computer 612). The body of the email message can be used to carry detailed instructions for the action to be carried out on the "CONTACT" database. In one embodiment, the body can directly carry commands that can be executed on the enterprise resource such as SQL queries to be executed on the "CONTACT" database. In other embodiments, the body of the email can be used to carry specific information that can be used to construct such a query, such as, an entry field (e.g., a name) into the database and specific fields within a record being requested by the user (e.g., a telephone number).

Once a query or other transaction is carried out within the enterprise computing resource application, a result or acknowledgement is generated in the form of an email reply to the sender. Thus, the sender can send an email message requesting a coworker's telephone number to computer 612 and obtain a reply email message with the telephone number, by way of example. In other embodiments, transactions could be carried out on customer support databases, customer lists, inventory databases, order entry systems and many other conceivable enterprise resources. The email from the sender can be sent as a result of direct entry into an email program, or alternatively, using an application that provides a clear user interface for a given application in which the sender fills in a form using direct entry, pull down menus, etc. In either case, the final message is simply an email message that can be generated directly without absolute need for an application interface so that the user can send the message from any system capable of sending an email message.

Those skilled in the art will appreciate that although the above description refers to email being directly sent to computers 612 and 630, for example, actual email delivery is conventionally carried out in a somewhat less direct manner. For example, in the case of email directed to computer 630, the email is actually sent to a mailbox on the Internet that is identified by a particular email address. The computer 630 then retrieves the email from the mailstore for processing. Similarly, email going into the enterprise is stored on an enterprise email system for retrieval by the enterprise computers such as 612 and 620. These email mechanics, however, do not alter the operation of the present invention and the discussion has accordingly been simplified to emphasize the invention itself rather than peripheral workings of an email system.

In order to preserve security, of course, additional steps are taken to assure that the user is authorized to carry out the transaction desired. This may require use of encryption, a designated list of authorized users, passwords or other known techniques. In the example process below, the security technique described provides a level of security by using a list of approved users and passwords to provide protection to the enterprise computing resources. Of course, more elaborate and sophisticated security measures can be implemented without departing from the invention.

Figure 7:
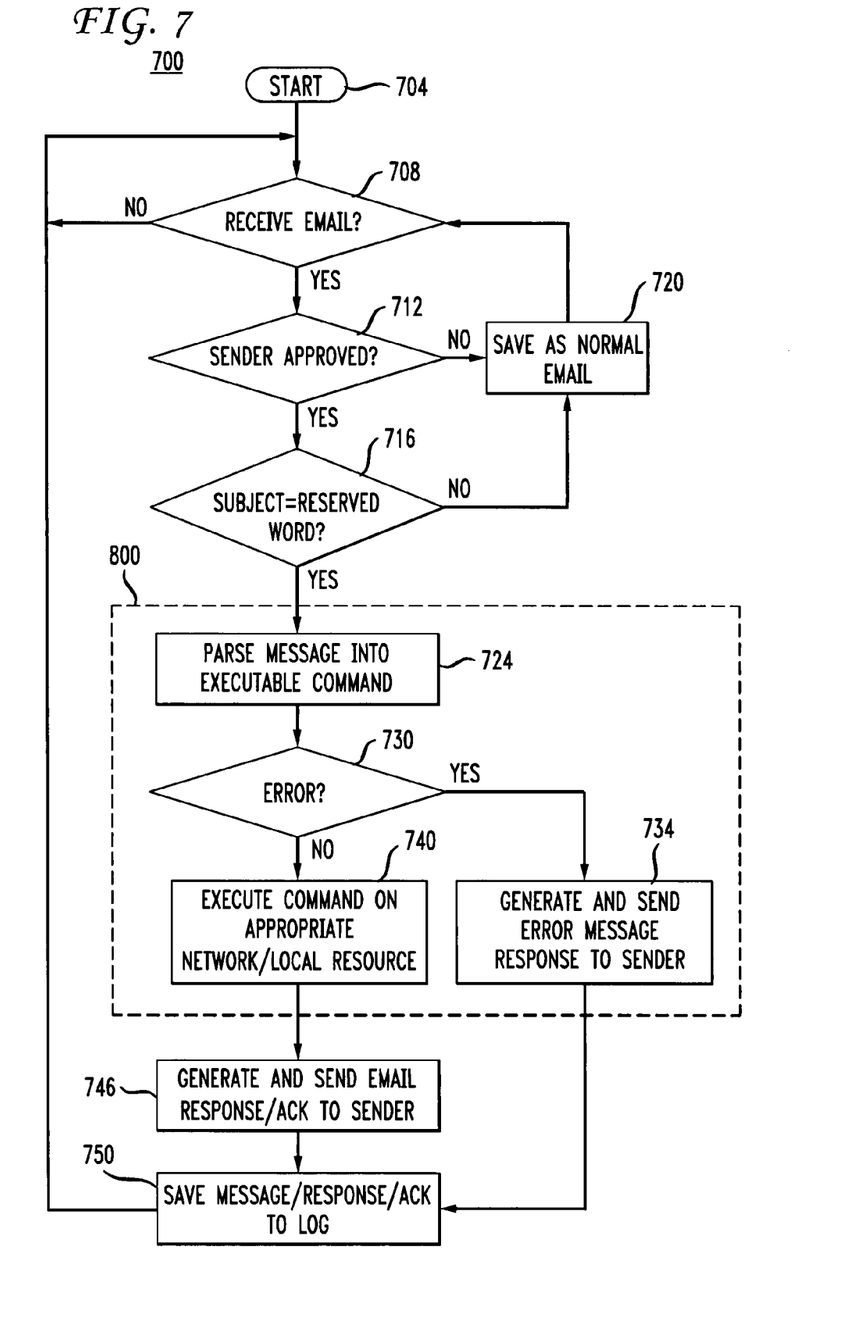
FIG. 7 is a flow chart illustrating a process consistent with an embodiment of the present invention.
Figure 8A:
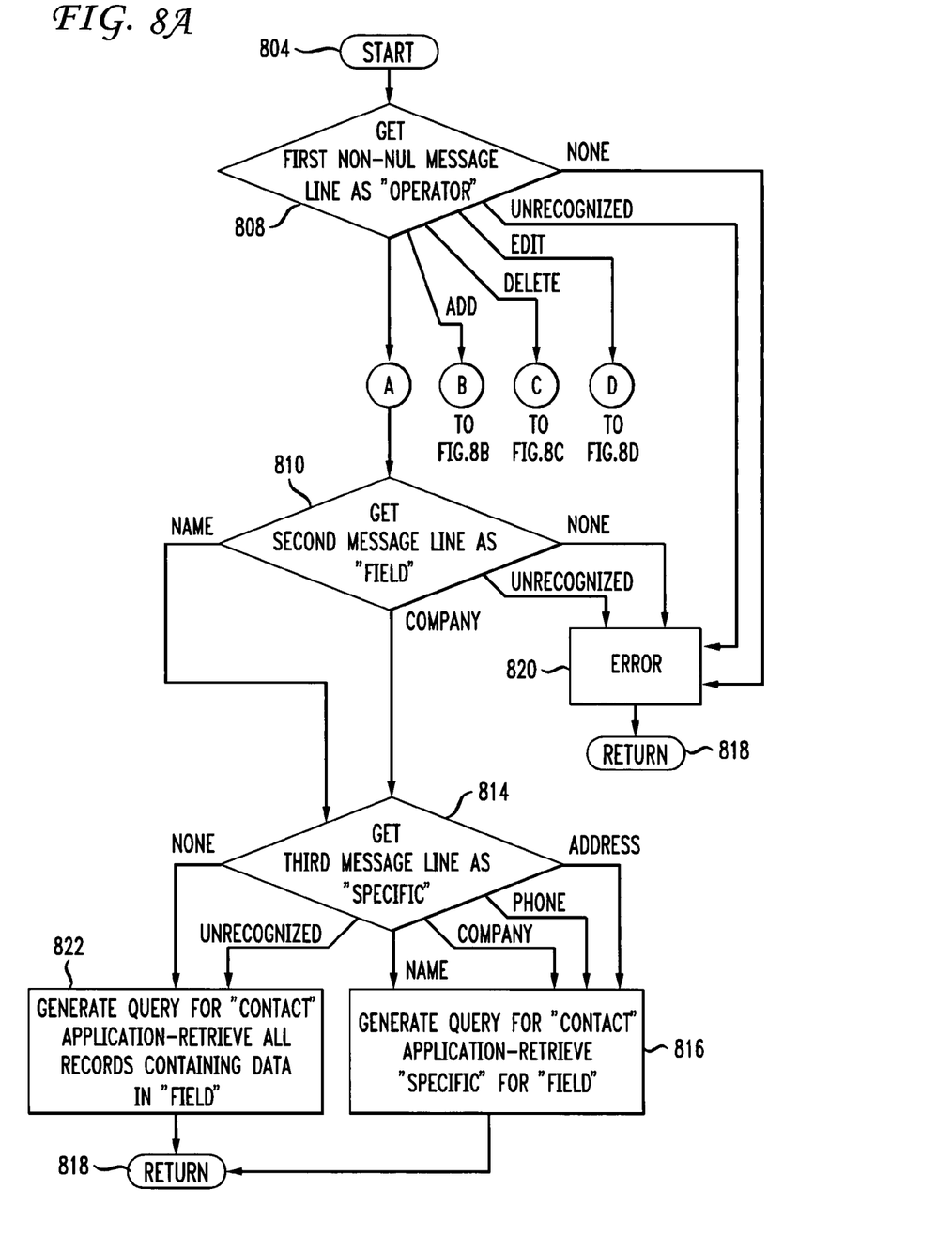
Figure 8B:
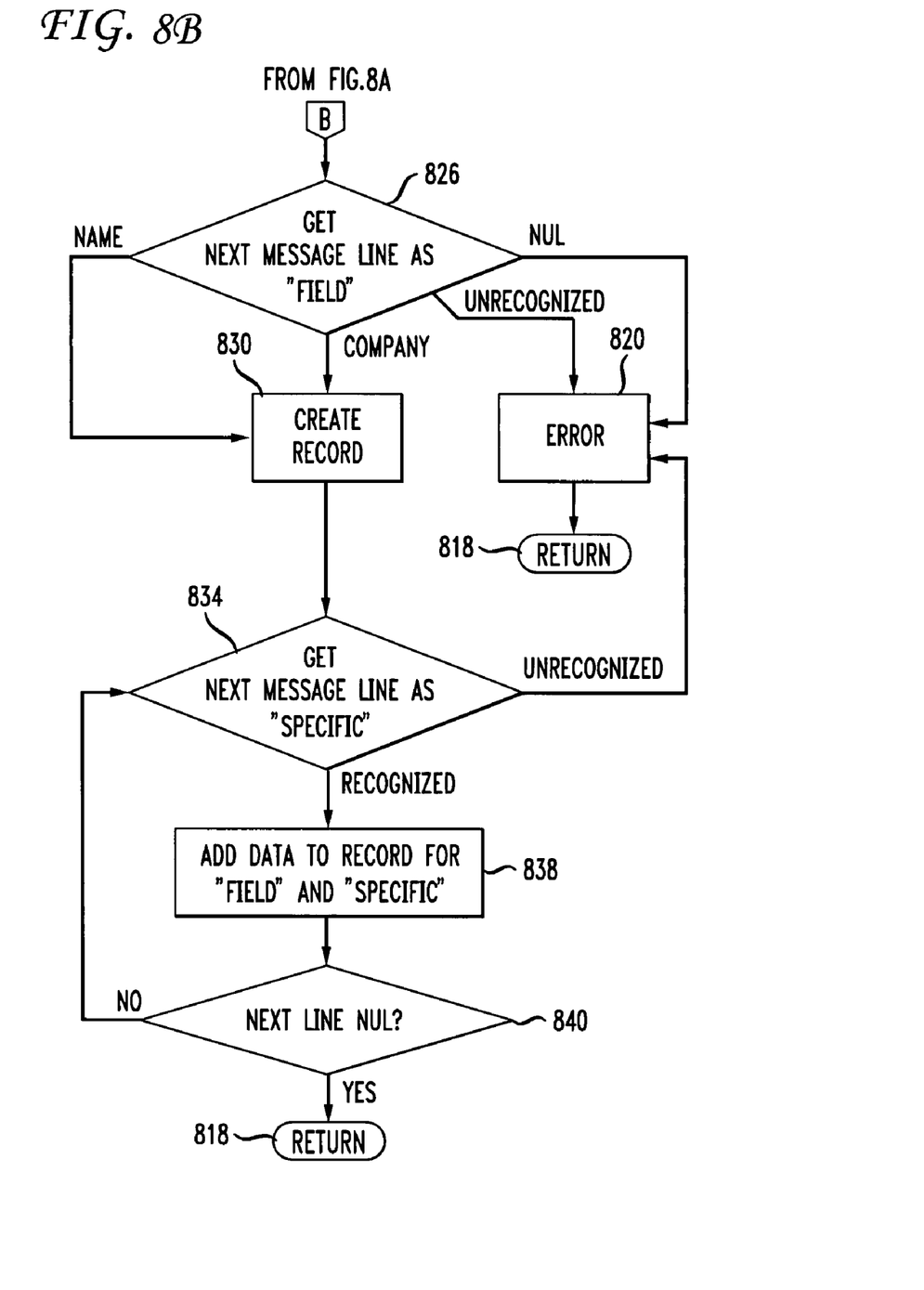
Figure 8C:
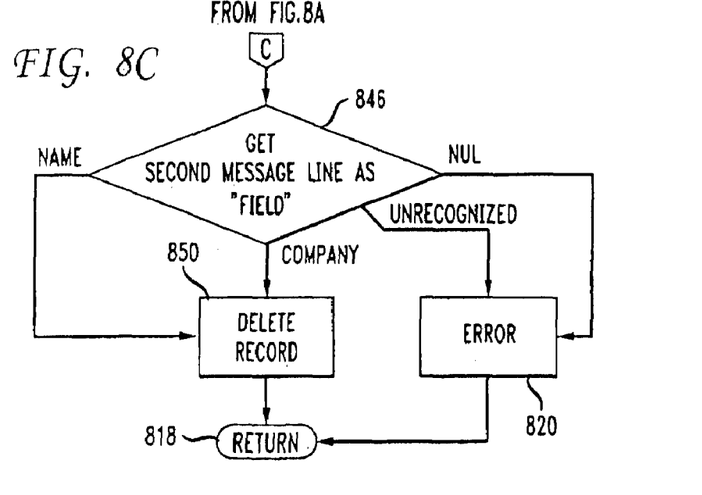
Figure 8D:
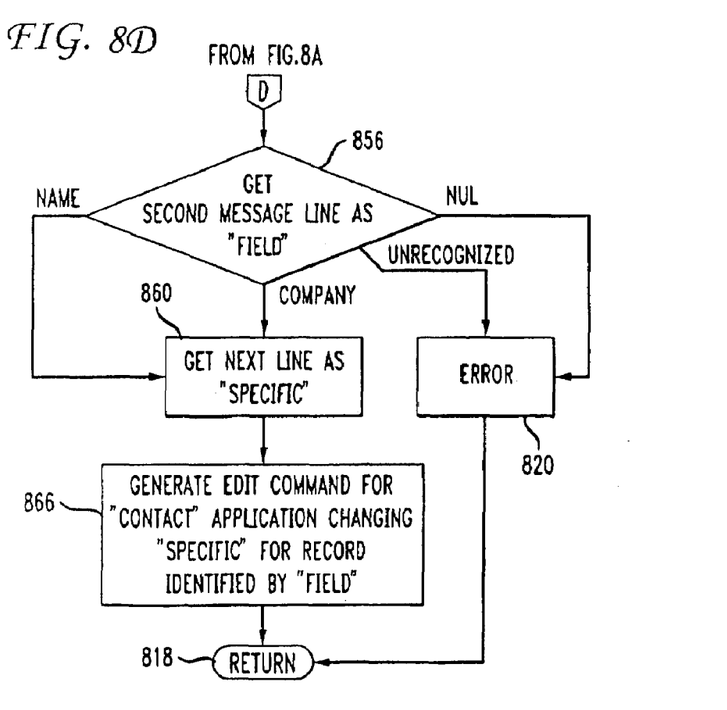

FIG. 7 illustrates a process 700 that implements an embodiment of the present invention at computer 612 starting at 704. Computer 612 waits at 708 until an email is received. Once received at 708, the email is inspected to determine if the user is an approved user by matching the email source address with approved addresses at 712. This phase may also include matching a password to further verify the sender's authority to use the system. If the sender is approved and the password is correct at 712, control passes to 716. However, if the sender is not approved, the email is saved as a normal email message at 720 and control returns to 708 to await the next email message.

At 716, according to the present embodiment, the subject section of the email is inspected to see if the subject section contains a reserved word indicating that the email message is actually carrying a command for execution on a computer resource forming a part of the enterprise's computing resources. If not, control passes to 720. If so, control passes to 724 where the remainder of the message is parsed into an executable command. If an error occurs during the parsing process of 724, it is detected at 730 and an error message is generated and sent to the sender as a reply email at 734. Otherwise, the command is executed on the appropriate enterprise resource (e.g., a contact manager application) at 740. At 746, an email response is generated from the results of the transaction carried out at 740, or an acknowledgement message is generated and sent to the sender as a reply email. In either of the cases of 734 or 746, the reply message, response or acknowledgement is logged to a log file at 750 and the process returns to 708 to await receipt of the next email message.

To illustrate the function of this invention with a simple exemplary embodiment, consider the case of a contact manager application residing on computer 612 (or 620). The contact manager might have a plurality of records containing names, company affiliations and telephone numbers. One such record is illustrated in Table 1 below:

TABLE 1

John Smith
ZYX Plastics Corporation
1 Plastic Place, Washington, DC 20231
1-800-555-5555

Table 1 reflects a record in the application "CONTACT" having fields "NAME", "COMPANY", "ADDRESS" and "PHONE" respectively. It will be appreciated that the exemplary database is dramatically simplified so as not to obscure the explanation of the invention with an unnecessarily complex (albeit more realistic) database structure. In this example, consider that four possible actions can be carried out using the Trojan horse technique described herein, namely retrieving information from a record, adding a record, deleting a record and editing a record. Those actions will be represented by the commands "GET", "ADD", "DELETE" and "EDIT" respectively.

With reference now to FIG. 8, consider an exemplary process carried out at computer 612 in which an email is received having the format illustrated in Table 2 below:

TABLE 2

| FROM: | approveduser1@palmtop.com |
|---|---|
| TO: | emailcommand@enterprise.com |
| SUBJECT: | CONTACT |
| PASSWORD | |
| OPERATOR | |
| FIELD | |
| SPECIFIC | |

In this example, the database "CONTACT" is to be manipulated by email transactions. The process 700 of FIG. 7 is carried out, with the subject line "CONTACT" identifying that the contact database is to be manipulated, until stage 800 is reached as represented by the process 800 of FIG. 8 starting at 804. The password appearing in the "PASSWORD" field is inspected at 712 along with the sender's identity.

After the password, the first non-null line of the message is inspected at 808 and the contents of the line equated to the OPERATOR. Consider the example below in Table 3 of a GET command equated to the OPERATER at 808.

TABLE 3

| FROM: | approveduser1@palmtop.com |
|---|---|
| TO: | emailcommand@enterprise.com |
| SUBJECT: | CONTACT |
| password | |
| GET | |
| NAME = | John Smith |
| PHONE | |

In the event of a GET operator, control passes to 810 where the next line of the message is retrieved and equated to FIELD. In this case, the field is the entry field of the contact database corresponding to the name John Smith. The final line, which is retrieved at 814 represents the SPECIFIC information desired, in this case a phone number. Control would pass from 814 to 816 to generate the appropriate query (e.g., an SQL query of the database) and the process returns at 818 to 746. The operation would be essentially identical in this simple example if the FIELD were COMPANY instead of NAME. In the event an error occurs by virtue of no data where needed or unrecognized data, control passes from 820 where an error message is generated for the sender. If at 814, no data is present for SPECIFIC or the data is unrecognized, the entire record is obtained at 822. Thus, to obtain an entire record corresponding to the FIELD, the next line can simply be left blank. Also, in the event multiple records match the FIELD, all records can be returned. For simplicity, only NAME and COMPANY are permitted as entry points in the example shown, but this is not to be considered limiting.

A record can also be added to the database CONTACT using a message such as that illustrated in Table 4 below:

TABLE 4

| | |
|---|---|
| FROM: | approveduser1@palmtop.com |
| TO: | emailcommand@enterprise.com |
| SUBJECT: | CONTACT |
| PASSWORD | |
| ADD | |
| NAME = | Joe Green |
| COMPANY = | ASDF Typing, Inc. |
| ADDRESS = | 123 Hickory St., Washington, D.C. 20231 |
| PHONE = | (123) 321-1234 |

In this example, control passes from 808 to 826 when the operator us ADD. At 826, the next line is retrieved as FIELD as a first piece of data for the database (e.g., a key field) and a record is created at 830. Control then passes to 834 where the next line is retrieved as a SPECIFIC. The SPECIFIC data are added to the record at 838 and the process returns to 834 through 840 as long as a null line is not reached. When a null line is reached, the process returns at 818. In the event any line is unrecognized at 826 or 834, control passes to 820 where an appropriate error message is generated and the process returns at 818. In the event the FIELD line is empty at 826, control similarly passes to 820.

In the event a DELETE operator is encountered at 808, control passes to 846 where the next line is retrieved to determine FIELD by NAME or COMPANY. The record is then deleted at 850 and the process returns at 818. If an error is encountered by virtue of a null or unrecognized field at 846, an appropriate error message is 15; generated at 820 and the process returns at 818. Such a DELETE command embedded in the email message is illustrated in Table 5 below.

TABLE 5

| | |
|---|---|
| FROM: | approveduser1@palmtop.com |
| TO: | emailcommand@enterprise.com |
| SUBJECT: | CONTACT |
| PASSWORD | |
| DELETE | |
| NAME = | John Smith |

In the event an EDIT operator is encountered at 808, control passes to 856 where the next line is retrieved to determine FIELD by NAME or COMPANY. The next message line is then retrieved at 860 that defines the edit operation as illustrated in Table 6. At 866 an appropriate edit command is generated and the process returns at 818. If an error is encountered by virtue of a null or unrecognized field at 856, an appropriate error message is generated at 820 and the process returns at 818.

TABLE 6

| | |
|---|---|
| FROM: | approveduser1@palmtop.com |
| TO: | emailcommand@enterprise.com |
| SUBJECT: | CONTACT |
| PASSWORD | |
| EDIT | |
| NAME = | John Smith |
| ADDRESS = | 2 Plastic Place, Washington, DC 20231 |

Thus, the present invention provides a mechanism for a user to access a secure database or other enterprise application through secure enterprise firewalls to carry out transactional processes. The method can be initiated using a palmtop computer or other email capable machine to remotely obtain information that would otherwise be inaccessible.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of using an email message to control a computer resource, comprising:
   receiving an email message from a sender that originates at a portable computer;
   recognizing a reserved command word within the email message;
   determining whether a plurality of separate parts of the email message include a respective plurality of identifiable portions of a command to be carried out on an available computer resource based on the reserved command word wherein the reserved command word comprises a part of a subject portion of the email message; and
   assembling a command for execution on the computer resource using the plurality of identifiable portions of the command in the plurality of separate parts of the email message.

2. The method according to claim 1, further comprising:
   receiving a result from the available computer resource; and
   sending a reply email message communicating the result to the sender.

3. The method according to claim 2, wherein the computer resource comprises a computer database, the command comprises a database query and wherein the result comprises the result of the database query.

4. The method according to claim 1, wherein the resource comprises a computer database and the command comprises a database query.

5. The method according to claim 1, wherein determining comprises parsing the email message into parts defining the computer resource and the command.

6. The method according to claim 1, wherein the email from the sender originating at the portable computer is a palmtop computer.

7. The method according to claim 1, carried out on a programmed processor protected by a firewall.

8. The method according to claim 7, wherein the programmed processor comprises a server providing an intralan resource within the firewall.

9. The method according to claim 1, carried out by executing a set of machine readable instructions stored on an electronic storage medium.

10. The method according to claim 1, wherein the plurality of separate parts of the email message are separate lines of the email message.

11. A method of using an email message to control a computer resource, comprising:
    receiving an email message from a sender, the email message originating at a palmtop computer;
    recognizing a reserved word within a subject portion of the email message wherein the reserved command word comprises a part of a subject portion of the email message;
    interpreting the email message as a command based on the reserved word to be carried out on an available computer resource comprising a computer database;
    determining whether a plurality of separate parts of the email message include a respective plurality of identifiable portions that define the computer resource and the command;
    assembling the plurality of identifiable portions in the plurality of separate parts of the email message as a database query for execution on the computer database;
    receiving a result from the available computer database; and
    sending a reply email message communicating the result to the sender.

12. The method according to claim 11, wherein the plurality of separate parts of the email message are separate lines of the email message.

13. A system that uses an email message to control a computer resource from a remote location, comprising:
    a first programmed processor having an email program that receives an email message from a sender;
    a program operating on the first programmed processor that:
      recognizes a reserved command word within the email message wherein the reserved command word comprises a part of a subject portion of the email message;
      determines whether a plurality of separate parts of the email message include a respective plurality of identifiable portions of a command to be carried out on an available computer resource based on the reserved command word; and
      assembles a command for execution on the available computer resource using the plurality of identifiable portions of the command in the plurality of separate parts of the email message.

14. The apparatus according to claim 13, wherein the program further:
    receives a result from the available computer resource; and
    sends a reply email message communicating the result to the sender.

15. The apparatus according to claim 14, wherein the computer resource comprises a computer database, the command comprises a database query and wherein the result comprises the result of the database query.

16. The apparatus according to claim 13, further comprising a palmtop computer wherein the email from the sender originates at the palmtop computer.

17. The apparatus according to claim 13, further comprising a second programmed processor wherein the email from the sender originates at the second programmed processor.

18. The apparatus according to claim 13, further comprising a firewall protecting the first programmed processor.

19. The apparatus according to claim 13, wherein the first programmed processor comprises a server providing an intralan resource within the firewall.

20. The apparatus according to claim 13, wherein the computer resource comprises a computer database and the command comprises a database query.

21. The system according to claim 13, wherein the plurality of separate parts of the email message are separate lines of the email message.

* * * * *